United States Patent
Seagle et al.

(10) Patent No.: US 6,754,049 B1
(45) Date of Patent: Jun. 22, 2004

(54) TRANSDUCERS FOR PERPENDICULAR RECORDING WITH INDUCTIVE CANCELLATION AT MR SENSOR

(75) Inventors: David J. Seagle, Morgan Hill, CA (US); Yugang Wang, Milpitas, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 296 days.

(21) Appl. No.: 09/978,435

(22) Filed: Oct. 16, 2001

(51) Int. Cl.[7] ................................................. G11B 5/33
(52) U.S. Cl. ....................................................... 360/317
(58) Field of Search ........................................ 360/317

(56) References Cited

U.S. PATENT DOCUMENTS

| | | | |
|---|---|---|---|
| 4,652,956 A | 3/1987 | Schewe | 360/123 |
| 4,672,493 A | 6/1987 | Schewe | 360/125 |
| 4,748,525 A | 5/1988 | Perlov | 360/110 |
| 4,771,350 A | 9/1988 | Desserre | 360/123 |
| 4,931,886 A | 6/1990 | Mallary | 360/55 |
| 5,075,956 A | 12/1991 | Das | 29/603 |
| 5,406,695 A | 4/1995 | Amemori | 29/603 |
| 5,703,740 A | 12/1997 | Cohen et al. | 360/126 |
| 5,875,080 A | 2/1999 | Seagle | 360/123 |
| 5,978,186 A | 11/1999 | Murata et al. | 360/123 |
| 5,995,341 A | 11/1999 | Tanaka et al. | 360/125 |
| 5,995,342 A | 11/1999 | Cohen et al. | 360/126 |
| 6,195,232 B1 | 2/2001 | Cohen | 360/126 |
| 6,204,997 B1 | 3/2001 | Sasaki | 360/123 |
| 6,504,675 B1 * | 1/2003 | Shukh et al. | 360/125 |

OTHER PUBLICATIONS

"3D Analysis of MR Readback on Perpendicular Medium," Bhattacharyya et al., IEEE Transactions on Magnetics, vol. 27, No. 6, Nov. 1991, pp. 4707–4709.

"Modeling of Various Magnetoresistive Head Designs for Contact Recording," Cain et al., IEEE Transactions on Magnetics, vol. 31, No. 6, Nov. 1995, pp. 2645–2647.

"Recording Characterisitcs of Single–Layer Perpendicular Media using Ring–Shaped Heads," Hirayama et al., IEEE Trnsactions on Magnetics, vol. 35, No. 5, Sep. 1999, pp. 2766–2768.

"High Writing–Sensitivity Single–Pole Head with Cusp–Field Coils," Ise et al., IEEE Transactions on Magnetics, vol. 36, No. 5, Sep. 2000, pp. 2520–2523.

* cited by examiner

*Primary Examiner*—William Korzuch
*Assistant Examiner*—Mark Blouin
(74) *Attorney, Agent, or Firm*—Mark Lauer; Silican Edge Law Group LLP

(57) ABSTRACT

Perpendicular recording and magnetoresistive sensing transducers are disclosed having additional coil windings carrying current in an opposite direction to windings encircled by a core. The magnetic influence of the recording transducer on the sense transducer is reduced or eliminated. The inductance of the coils used to drive the recording transducer is reduced, facilitating high-frequency operation. Moreover, the magnetic flux induced by the coils and transmitted by the recording pole tip is increased, improving recording capabilities.

20 Claims, 6 Drawing Sheets

TRANSDUCERS FOR PERPENDICULAR RECORDING WITH INDUCTIVE CANCELLATION AT MR SENSOR

BACKGROUND

The present invention relates to electromagnetic transducers for information storage and retrieval systems, such as disk or tape drives.

Current commercially available disk drives employ magnetoresistive (MR) sensors for reading data, and store data in domains having magnetizations that are substantially parallel to concentric media tracks, the parallel magnetic storage sometimes called longitudinal recording. It has been predicted that such longitudinal magnetic storage will become unstable at normal operating conditions when the domains reach a minimal size, termed the superparamagnetic limit. In order to store the data at higher density, the drive system may instead be designed to store data in domains that are substantially perpendicular to the disk surface, which may be termed perpendicular recording.

Prior art systems for perpendicular recording include an inductive transducer positioned in close proximity to a surface of a disk. The inductive transducer has a U-shaped core formed of high-permeability, low-coercivity or "soft" magnetic material and the media has a soft magnetic underlayer, the core and underlayer forming a magnetic circuit that traverses a higher coercivity media layer, for magnetizing the media layer or reading the magnetization of the media layer. The core has magnetic pole tips that differ in area so that the magnetic signal is concentrated in the smaller pole tip for reading or writing data. The pole tips are sufficiently separated to encourage magnetic flux to travel through the media, instead of across a submicron nonmagnetic gap that is typically employed for longitudinal recording.

MR sensors sense a change in magnetic field at the sensor with a change in resistance of the sensor, which may be measured as a change in current or voltage across the sensor. In an attempt to limit the sensing of a MR sensor to the individual bit directly adjacent the sensor, magnetic shields are disposed in the transducer adjacent the sense element, shielding the sense element from the magnetic fields emanating from adjacent bits.

The present inventors have discovered, however, that the shields can form a magnetic circuit with the media underlayer used in perpendicular recording, causing problems in reading and writing. Moreover, the relatively large distance between the trailing perpendicular recording pole tip and a MR sensor disposed on an opposite side of the flux return pole tip can cause misalignment of the MR sensor and the recording pole tip. In addition, increasing the density of bits on each track and the disk speed requires higher frequency recording, for which inductance of the coils and core may become problematic.

SUMMARY

In accordance with the present invention, embodiments of a merged perpendicular recording and magnetoresistive sensing transducer are disclosed in which the magnetic influence of the recording transducer on the sense transducer and the shields is reduced. As one example, the magnetic flux produced by the recording coil may be essentially zero at the sense transducer. Another advantage of the invention is that the inductance of the coils used to generate magnetic flux in the recording transducer is reduced, facilitating high-frequency operation. Moreover, the magnetic flux generated by the core and transmitted by the recording pole tip may be increased, improving recording capabilities. In brief, various embodiments of a merged transducer are disclosed having increased recording flux, reduced inductance and reduced influence of the recording elements on the sensing elements, for greatly improved performance.

DETAILED DESCRIPTION OF THE PREFERRED EMBODIMENTS

Figure 1:
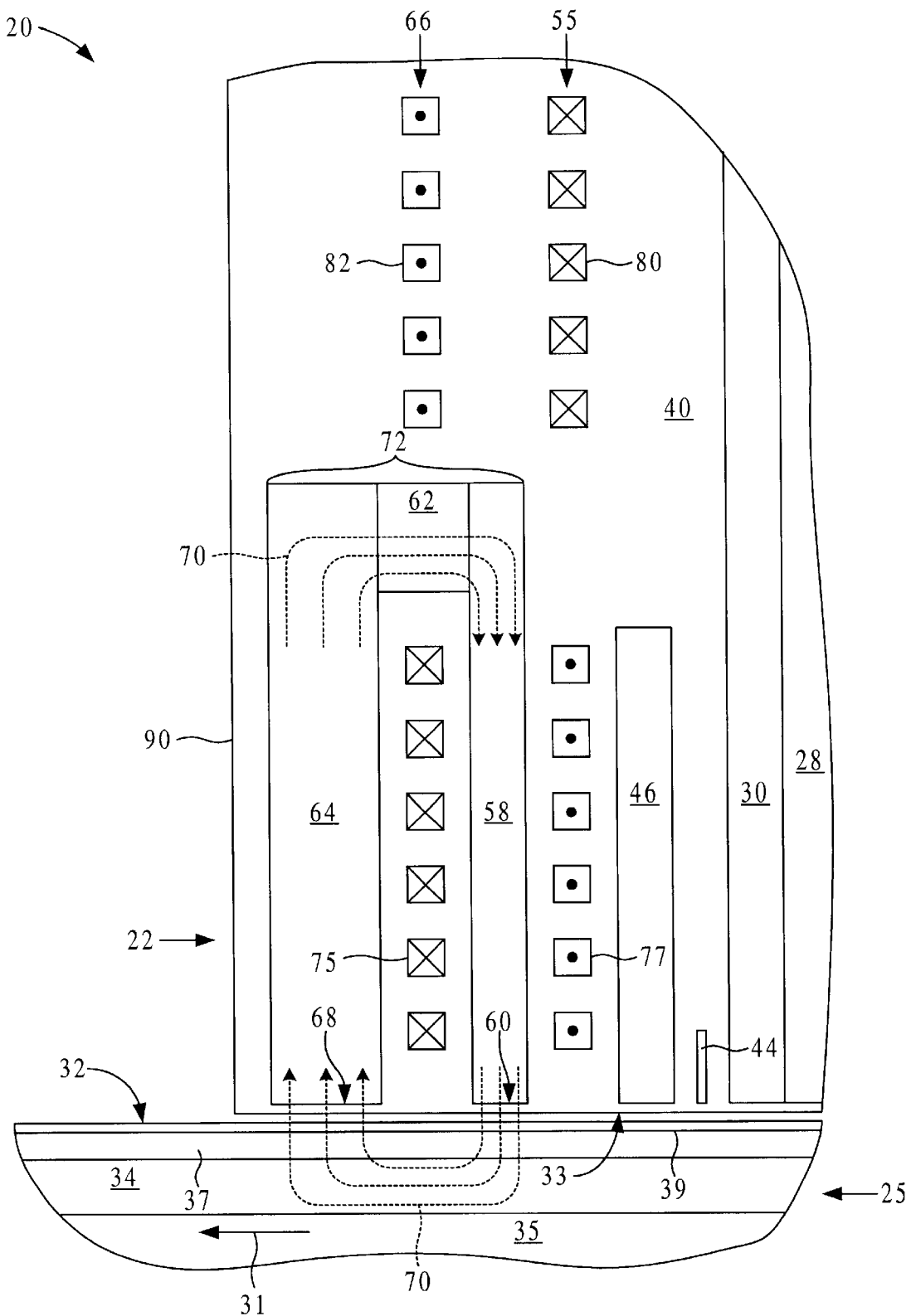
FIG. 1 is a cutaway cross-sectional view of a portion of an information storage system including a merged perpendicular recording and magnetoresistive sensing transducer disposed adjacent to a spinning disk, with a pair of coil layers carrying current in opposite directions.

FIG. 1 depicts a cutaway cross-sectional view of a portion of an information storage system 20 including a merged perpendicular recording and magnetoresistive sensing transducer 22 disposed adjacent to a media such as a spinning disk 25. The transducer 22 is formed in a plurality of adjoining solid layers on a wafer substrate 28 that may remain affixed to the transducer 22. A media-facing surface 33 of the solid body that includes the transducer 22 may be formed with a desired relief for fluid and solid interaction with the disk 25, and the body may be termed a head or slider.

The disk 25 may be conventional and includes a self-supporting substrate 35, a low-coercivity, high-permeability or "soft" magnetic underlayer 34, a media layer 37 and a protective overcoat 39. The disk 25 is spinning in a direction indicated by arrow 31 and has a surface 32 adjacent the media-facing surface 33 of the head.

Atop the slider substrate 28 a first soft magnetic shield layer 30 has been formed, for example of permalloy ($Ni_{0.8}Fe_{0.2}$) either directly or atop an undercoat layer, not shown. A first layer of nonmagnetic, electrically insulating material has been formed on the shield layer, followed by a magnetoresistive (MR) sensor 44. The MR sensor can be any sensor that utilizes a change in resistance caused by a change in magnetic field to sense that field, which may be measured as a change in current or voltage across the sensor, including anisotropic magnetoresistive (AMR) sensors, spin-valve (SV) sensors, spin-tunneling (ST) sensors, giant magnetoresistive (GMR) sensors and colossal magnetoresistive (CMR) sensors. A second layer of nonmagnetic, electrically insulating material has been formed between the MR sensor and a second soft magnetic shield layer 46. The first and second layers of nonmagnetic, electrically insulating material, as well as additional layers of such material, are indicated together as region 40. The MR sensor 44 may be electrically connected to the shield layers 30 and 46 in some embodiments, such as spin-tunneling sensors.

A first electrically conductive coil layer 55 is separated from second shield layer 46 by another nonmagnetic, electrically insulating layer, and is isolated from a first soft magnetic pole layer 58 by additional nonmagnetic, electrically insulating material. First pole layer 58 terminates adjacent the media-facing surface in a first pole tip 60 that faces the media 25. A soft magnetic stud 62 connects the first pole layer 58 with a second soft magnetic pole layer 64. Second pole layer 64 terminates adjacent the media-facing surface in a second pole tip 68 that faces the media 25. Second pole layer 64 is thicker than the first pole layer 58 and serves as a flux return pole, and first pole tip 60 has a much smaller media-facing area than second pole tip 68. In an alternative embodiment, the first pole layer 58 is thicker than the second pole layer 64 and serves as a flux return pole, and the second pole tip 68 has a much smaller media-facing area than first pole tip 60.

A second electrically conductive coil layer 66 is partly disposed between first pole layer 58 and second pole layer 64 for driving the magnetic circuit. Coil layer 66 has a first plurality of winding sections 75 that are all directed in substantially the same direction in a region encircled by a magnetic circuit 72 formed by first pole layer 58, stud 62, second pole layer 64 and underlayer 34. With the electrical current directed into the page as indicated by the crosses in winding sections 75, magnetic flux 70 is directed as shown, with each of the pole layers contributing magnetic flux in the same (clockwise) direction of the circuit 72. Since magnetic flux 70 travelling through magnetic circuit 72 is concentrated at first pole tip 60, that pole tip 60 provides a stronger magnetic field to the media 25 and is used to write information such as data to the media.

A second plurality of winding sections 77 is disposed between pole layer 58 and shield 46 and carries current in an opposite direction from winding sections 75, as indicated by the points in winding sections 77 representing current directed out of the page. Magnetic flux induced by winding sections 77 is directed toward media 25 in both pole layer 58 and pole layer 64, those fluxes opposing each other so that winding sections 77 contribute less overall magnetic flux to the magnetic circuit 72 than that contributed by winding sections 75.

Winding sections 77 counteract the magnetic flux induced by winding sections 75 in shield 30, shield 40 and MR sensor 44, reducing destabilizing effects of the perpendicular write transducer on the MR sensor. As described below, the induced flux from coil layer 55 can be configured to essentially completely cancel the magnetomotive force induced by coil layer 66 at the MR sensor 44, substantially eliminating the effect of those coil layers on the MR sensor.

Moreover, additional winding sections 80 of coil layer 55 carry current in an opposite direction from additional winding sections 82 of coil layer 66, so that the inductance of those sections is substantially canceled by each other. Similarly, the inductance of winding sections 75 is substantially canceled by the inductance of winding sections 77. Thus the overall inductance of coil layers 55 and 66 is substantially less than that of either layer 55 or layer 66 alone, significantly increasing the frequency at which data can be written, thereby providing increased storage density and, for disks that spin at a substantially constant speed, increased data access rates.

The coil layers 55 and 66 can be substantially identical spirals that are interconnected at the innermost section of each spiral, with an outermost section of each spiral connected to receive current from electronics of the information storage system. Thus a current spiraling inward along coil layer 55 spirals outward along coil layer 66, with the direction of the current opposite for the two layers. Alternatively, the coil layers 55 and 66 may be identical spirals that are connected to drive electronics in the middle and connected to each other at an outermost section. Moreover, although a plurality of coil sections 75 and 77 are shown, a single coil section 75 and a single coil section 77 may suffice.

Figure 2:
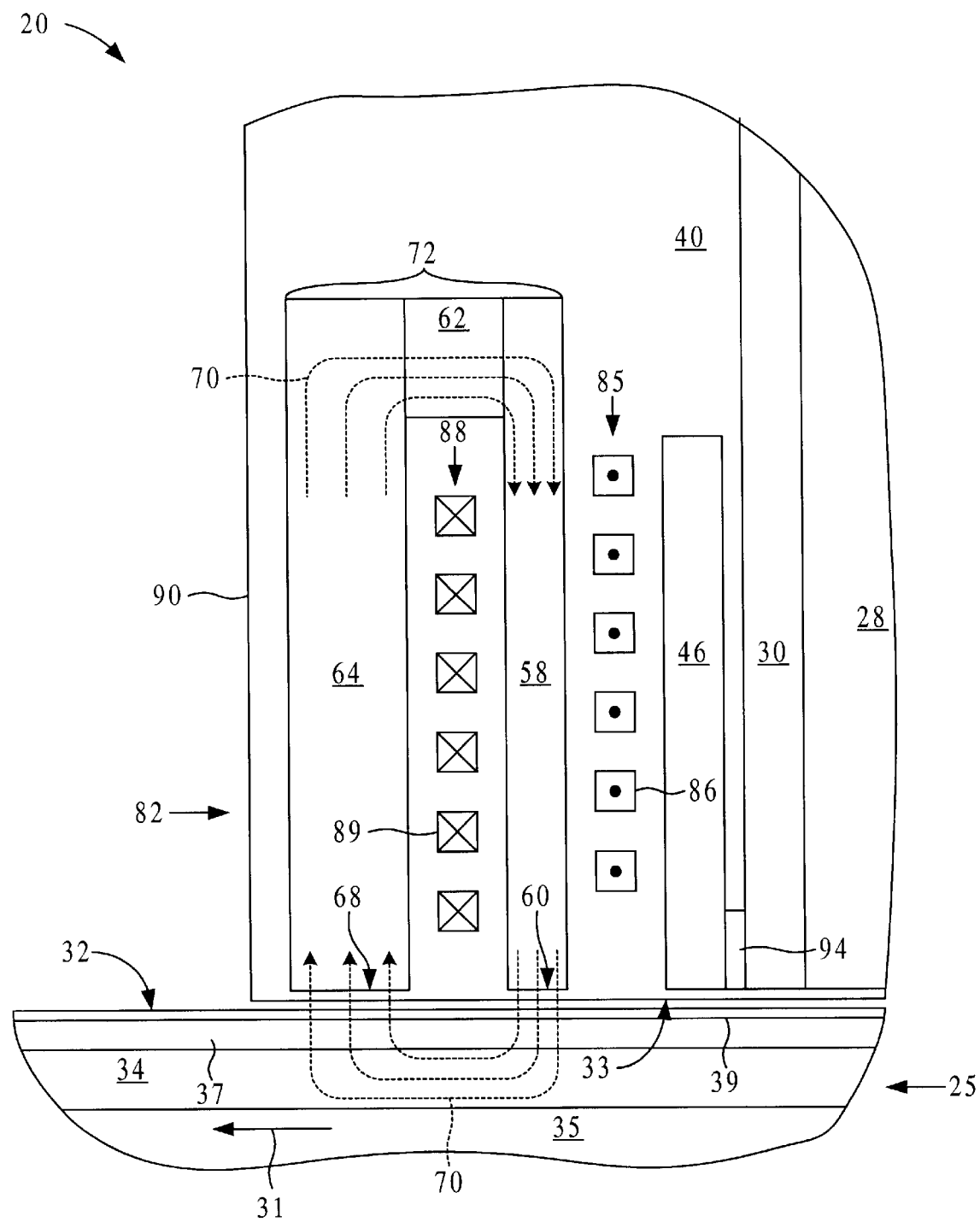
FIG. 2 is a cutaway cross-sectional view of a merged perpendicular recording and magnetoresistive sensing transducer with a solenoidal configuration that encircles one of the pole layers of the transducer.

Alternatively, as shown in FIG. 2, a conductive coil can be connected in a solenoidal configuration that encircles one of the pole layers of transducer 82. In order to illustrate differences of this approach, FIG. 2 is similar to FIG. 1, except for coil layers 85 and 88 and MR sensor 94. In the embodiment shown in FIG. 2, coil layers 85 and 88 do not have sections that wind in a spiral in each respective layer. Instead, layer 85 has a plurality of winding sections 86, and layer 88 has a plurality of winding sections 89, with each winding section 86 connected to a winding section 89.

In the embodiment of FIG. 2, a spin-tunneling sensor 94 is shown connected to the shield layers 30 and 46, which also serve as or include conductive leads for the sensor 94. Electrical current in sensor 94 is directed perpendicular to the plane of the sensor 94 layers, versus an in-plane direction of current for sensor 44. The electrical connection between the shields 30 and 46 and the sensor 94 can make stray magnetic flux in the shields even more problematic for the spin-tunneling sensor 94 than for other sensors such as sensor 44.

While FIG. 1 shows a current in-plane sensor 44 combined with a pair of spiral coil layers 55 and 66, and FIG. 2 shows a current perpendicular-to-plane sensor 94 combined with solenoidal configuration of coil layers 85 and 88, converse combinations are possible. Moreover, although FIG. 1 and FIG. 2 show the recording pole tip 60 closer than the return flux pole tip 68 to the MR sensor 44, the reverse configuration is also possible. It is also possible for an electromagnetic sensor such as a MR or optical sensor to be located closer than the recording transducer to a trailing edge 90 of the head.

Figure 3:
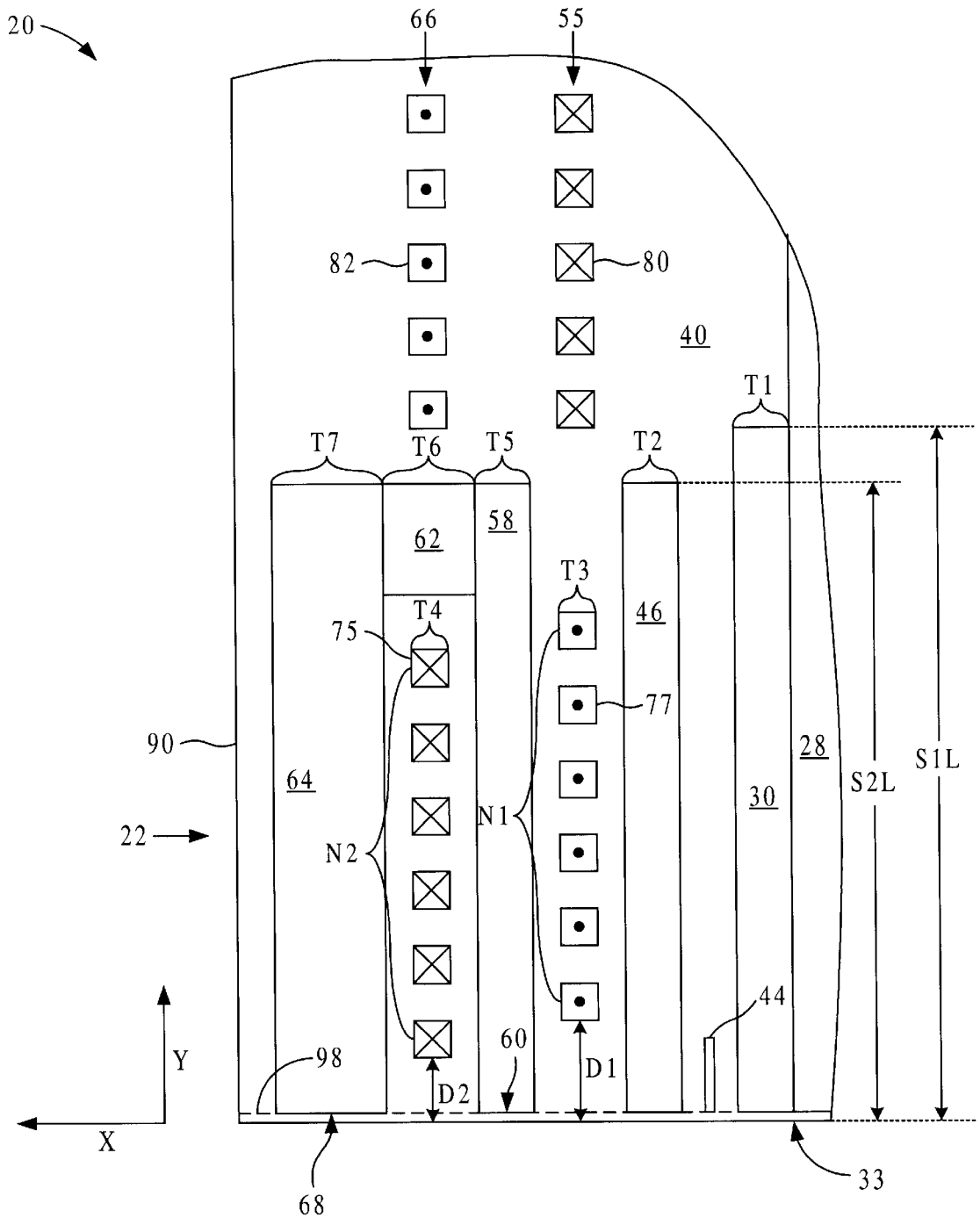
FIG. 3 is a cutaway cross-sectional view of the transducer of FIG. 1 showing various distances and dimensions.

To facilitate discussion of additional inventive features, FIG. 3 labels the transducer 22 of FIG. 1 with dimensions for various elements, as shown in X and Y directions. The Y direction is away from the media and substantially perpendicular to the media-facing surface 33. The X direction is orthogonal to the Y direction and oriented substantially along a line between a center of the MR sensor 44 and a center of the recording pole tip 60. The X direction is thus oriented substantially along a track that is closest to sensor 44 and pole tip 60, neglecting skew. The Z direction is into the drawing page, away from the viewer.

Y dimensions for elements are measured from the media-facing surface 33, although a thin protective coating 98 (e.g., less than 10 nm of DLC) may isolate magnetically active elements from the media-facing surface 33. Thus D1 is the distance of first coil layer 55 from the media-facing surface 33, and D2 is the distance of second coil layer 66 from the media-facing surface 33. Similarly, S1L is a length of first shield 30 measured from the media-facing surface 33, and S2L is a length of second shield 46 measured from the media-facing surface 33. T1 through T7 are the thicknesses of various layers of active elements. That is, T1 is the thickness of the first shield 30, T2 is the thickness of the second shield 46, T3 is the thickness of the first coil layer 55, T4 is the thickness of the second coil layer 66, T5 is the thickness of the first pole layer 58, T6 is the thickness of the stud 62 and T7 is the thickness of the second pole layer 64. N1 is the number of turns in first coil layer 55, and N2 is the number of turns in second coil layer 66.

Figure 4:
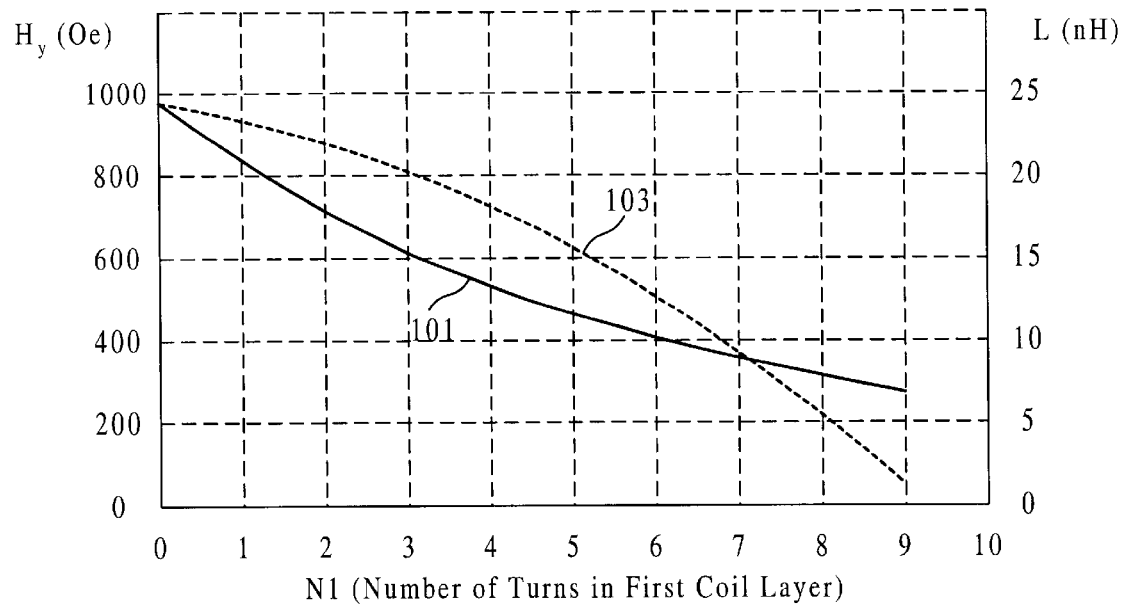
FIG. 4 is a plot of the inductance of the coil layers and the magnetic field strength at the sensor while varying the number of windings in one of the coil layers.

FIG. 4 shows some effects of varying the number of winding sections N1 of auxiliary coil layer 55 while holding other elements constant. FIG. 4 plots the inductance L of the coil layers 55 and 66, and the magnetic field strength in the Y direction ($H_y$) at the sensor 44 caused by coil layers 55 and 66, for the case in which second coil layer 66 has nine turns (N2=9) and first coil layer 55 varies between zero and nine turns ($0 \geq N1 \geq 9$). The inductance L is shown in nano-Henries (nH) as a solid line 101 and magnetic field $H_y$ is shown in Oersted (Oe) as a broken line 103 in FIG. 4.

The conventional situation in which coil layer 55 does not exist is shown as zero turns (N1=0), for which the magnetic field $H_y$ at the sensor is nearly one-thousand Oe and the inductance L of coil layer 66 is nearly twenty-five nH. Improvement in both measures can be seen with the provision of additional coil turns in coil layer 55 up to the case in which coil layer 55 also has nine turns (N1=9), for which the magnetic field $H_y$ at the sensor has dropped to nearly zero (about one) Oe and the inductance L of coil layer 66 is about seven nH. FIG. 4 provides a graphic illustration of the reduction in inductance and substantial cancellation of stray recording field at the sensor with the addition of a matching auxiliary coil layer 55 carrying current opposite to that of the coil layer 66 disposed between the pole layers 58 and 64.

Figure 5:
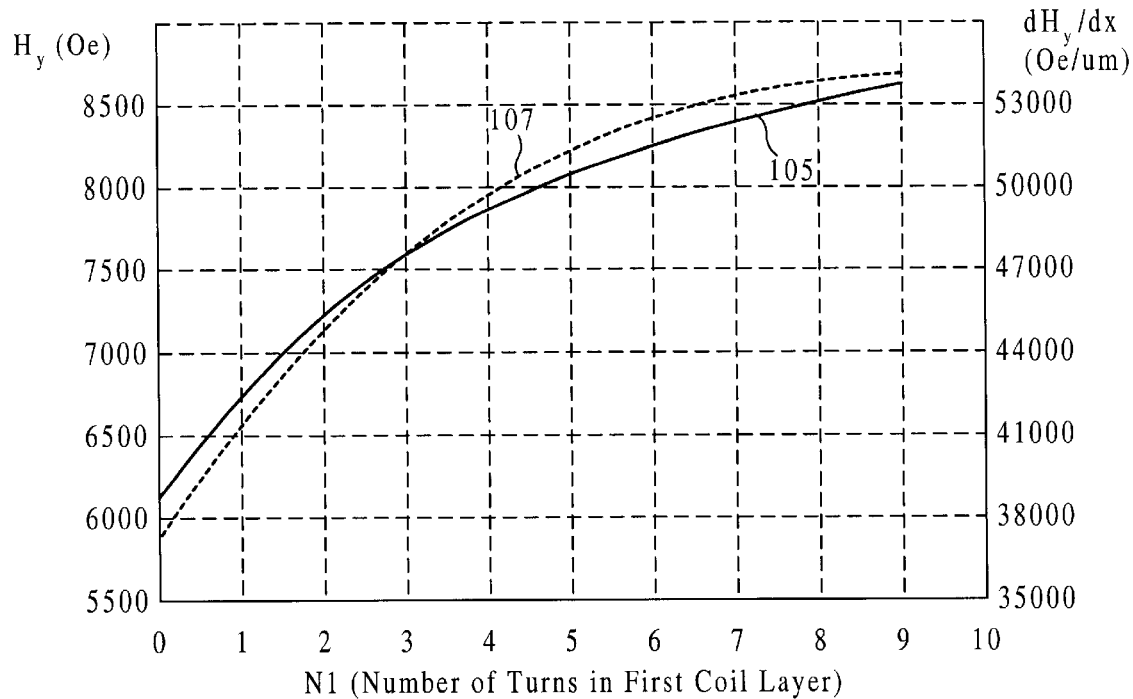
FIG. 5 is a plot of the write field and the write field gradient at the media layer adjacent the recording pole tip while varying the number of windings in one of the coil layers.

FIG. 5 shows other performance parameters for a transducer similar to that shown in FIG. 3 and for which second coil layer 66 has nine turns (N2=9) and first coil layer 55 varies between zero and nine turns ($0 \geq N1 \geq 9$). The write field $H_y$ at the media layer 37 adjacent recording pole tip 60 is shown in Oersted (Oe) as a solid line 105 and the write field gradient $dH_y/dx$ at that location is shown in Oersted/micron (oe/$\mu$m) as a broken line 107. The conventional situation in which coil layer 55 does not exist is shown as zero turns (N1=0), for which the magnetic field $H_y$ at the media layer 37 is about six-thousand one-hundred Oe and the write field gradient $dH_y/dx$ is less than thirty-eight-thousand Oe/$\mu$m. Improvement in both write field $H_y$ and write field gradient $dH_y/dx$ can be seen with the provision of additional coil turns in coil layer 55 up to the case in which coil layer 55 also has nine turns (N1=9), for which the magnetic field $H_y$ at the sensor has increased to about eight-thousand one-hundred Oe and the write field gradient $dH_y/dx$ is about than fifty-four-thousand Oe/$\mu$m. FIG. 5 thus provides a graphic illustration of the increase in recording field $H_y$ and recording field gradient $dH_y/dx$ at the media layer 37 with the addition of a matching auxiliary coil layer 55 carrying current opposite to that of the coil layer 66 disposed between the pole layers 58 and 64.

Figure 6:
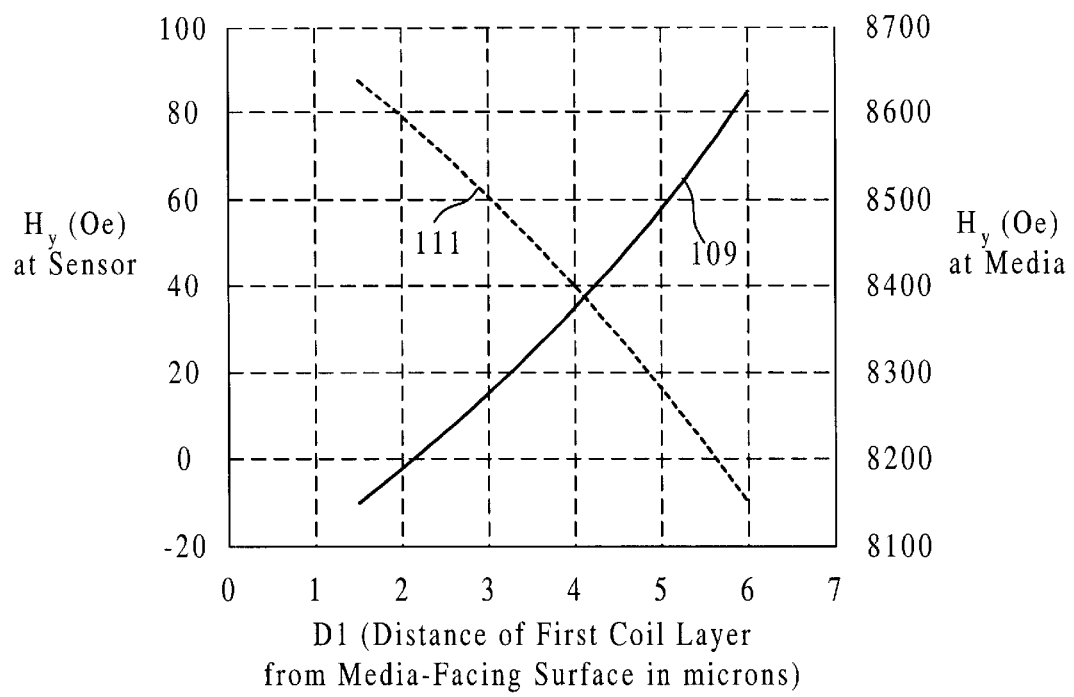
FIG. 6 is a plot of the write field at the media layer adjacent the recording pole tip and the magnetic field strength at the sensor while varying the distance of one coil layer from the media-facing surface.

FIG. 6 shows some effects of varying the distance D1 of auxiliary coil layer 55 from the media-facing surface 33 while D2 is held fixed at six microns and both coils have six turns (N1=N2=6). On the left side of FIG. 6 is the magnetic field $H_y$ at the sensor 44 from the coil layers 55 and 66, which is plotted versus D1 as a solid line 109. On the right side of FIG. 6 is the magnetic field $H_y$ at the media adjacent the recording pole tip 60, which is plotted versus D1 as a broken line 111. The stray field $H_y$ at the sensor 44 is approximately zero for D1 equal to two microns. Surprisingly, the stray field $H_y$ at the sensor 44 increases as D1 increases to six microns, at which D1=D2. The magnetic field $H_y$ at the media adjacent the recording pole tip 60 is about 8600 Oe for D1 equal to two microns, and decreases to about 8175 D1 equal to six microns. In other words, for this embodiment the stray field at the sensor can be cancelled and the write field improved by positioning the auxiliary coil layer 55 closer than the main coil layer 66 to the media-facing surface 33. Although the invention is not to be limited to any particular theory, a reason for this effect may be the more efficient coupling of main coil layer 66 than auxiliary coil layer 55 to magnetic circuit 72, so that auxiliary coil layer 55 in this example is closer than the main coil layer 66 to the sensor 44 in both the X and Y directions.

Figure 7:
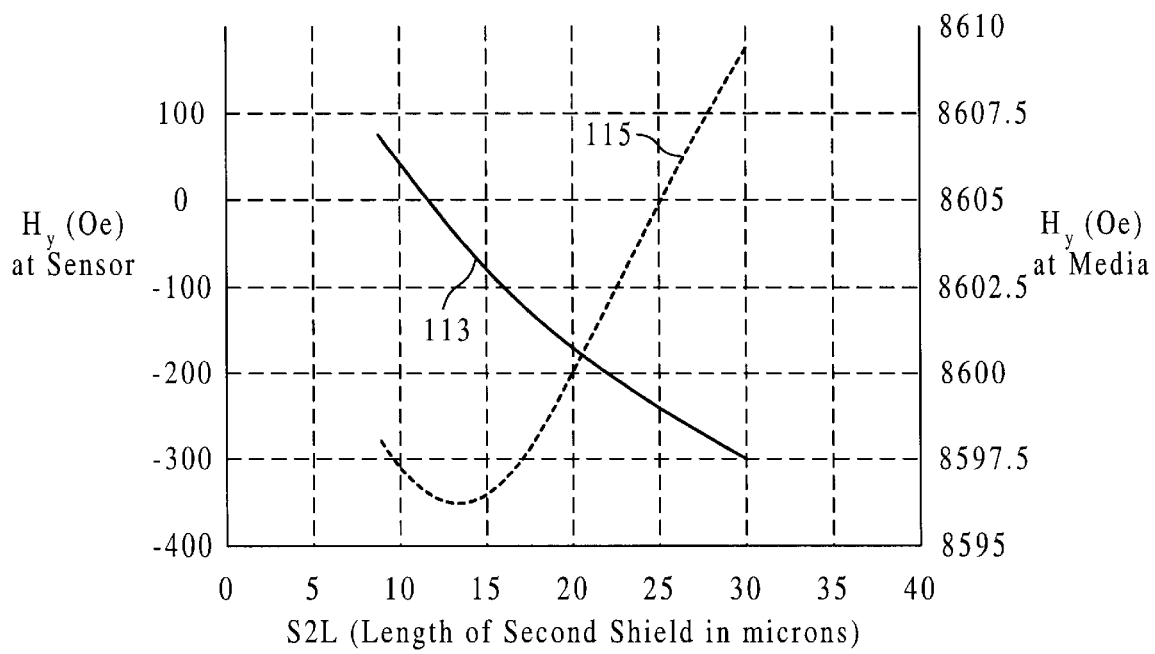
FIG. 7 is a plot of the write field at the media layer adjacent the recording pole tip and the magnetic field strength at the sensor while varying the length of a shield layer from the media-facing surface.

FIG. 7 shows some effects of varying the length S2L of second shield layer 46 from the media-facing surface 33 while other elements are unchanged. In this example, D1 is fixed at six microns, D2 is fixed at four microns and both coils have six turns (N1=N2=6). First pole layer 58 has a length in this example of twenty-nine microns. The length S1L of first shield layer 30 does not have a substantial effect on performance provided that it is in a range between about ten microns and one hundred microns. The stray field $H_y$ at the sensor 44 is listed on the left side of FIG. 7 and plotted versus S2L as a solid line 113. The recording field $H_y$ at the media layer adjacent pole tip 60 is listed on the right side of FIG. 7 and plotted versus S2L as a broken line 115. The stray field $H_y$ at the sensor 44 is zero when the length S2L of the second shield layer 46 about twelve microns in this example.

The length S2L of the second shield layer 46 will influence the amount of flux coupled to the sensor from the first coil 55 since it comprises part of the magnetic circuit of first coil 55. The length of S2L will also influence the amount of flux coupled to the sensor from the second coil 66. That is, the second shield 46 is also part of the magnetic circuit of the second coil 66. The sensitivity of flux coupling with S2L length is different for each of the coils 55 and 66 and the signs of the respective fluxes are opposite. Thus when S2L is very small, first coil 55 dominates and a large positive flux is coupled to the sensor. When S2L is large, second coil 66 dominates and a large negative flux is coupled to the sensor. In example of FIG. 7, at S2L equal to about 12 microns the two fluxes cancel leaving the sensor unaffected by the write current.

The recording field $H_y$ at the media layer adjacent pole tip 60 is slightly reduced S2L=12 $\mu$m compared to S2L=30 $\mu$m, at about 8596 Oe compared to about 8609 Oe, respectively. Thus it is advantageous for S2L to be less than the length of first pole layer 58 in this example.

Referring again to FIG. 3, a method for making the transducer 22 in accordance with the present invention is described. The transducer 22 is formed along with thousands of similar transducers, not shown, on the wafer substrate 28, which may be made of AlTiC, Alumina, SiC or other known materials. Atop the wafer substrate 28 the first soft magnetic shield layer 30 is formed, for example by window frame plating, either directly on the substrate or atop a seed layer, not shown. First shield layer 30 may have a thickness T1 after lapping of about two $\mu$m, a height S1L of about thirty $\mu$m and a width of about ten $\mu$m, for example.

An alumina or other dielectric layer is then deposited and lapped to form a coplanar surface with the first shield layer 30. A first submicron read gap layer of nonmagnetic, electrically insulating material is formed on the shield layer, followed by a magnetoresistive (MR) sensor 44. A second submicron read gap layer of nonmagnetic, electrically insulating material is then formed between the MR sensor and the second soft magnetic shield layer 46. The first and second layers of nonmagnetic, electrically insulating material, as well as additional layers of such material, are indicated together as region 40. The MR sensor 44 may be electrically connected to the shield layers 30 and 46 in some embodiments, such as spin-tunneling sensors.

The second shield layer 46 is formed, for example by window frame plating, to a thickness T2 after lapping of about two $\mu$m and a width of about ten $\mu$m, for example. As noted above, the height S2L of second shield layer 46 is a controlled parameter in obtaining zero stray field at the MR sensor 44, and may be about equal to that of the pole layers 58 and 64, or about twelve $\mu$m in this embodiment. Since other factors may be employed to obtain zero stray field at the MR sensor 44, the height of the second shield layer may be in a range between about five $\mu$m and one hundred $\mu$m.

After lapping the second shield layer 46 another dielectric layer is formed to a thickness that may preferably be between less than one $\mu$m and several $\mu$m, upon which the first electrically conductive coil layer 55 is formed, for example by frame plating. First coil layer 55 may be formed of copper, gold, silver or other electrically conductive materials, and is shown in perspective view in FIG. 8. First coil layer 55 is formed in a spiral formation with winding sections 77 substantially parallel to the media-facing surface 33 in a region adjacent to second shield 46. First coil layer 55 may have thickness T3 on the order of one $\mu$m, and winding sections 77 have a square cross-section about 1.5 $\mu$m on each side in one embodiment, with a distance between winding sections 77 about one $\mu$m. As noted above, the distance D1 of first coil layer 55 from the media-facing surface 33 is a controlled parameter in obtaining zero stray field at the MR sensor 44, and may be less than that the distance D2 of second coil layer 66 from the media-facing surface, or about four microns in this embodiment. Since other factors may be employed to obtain zero stray field at the MR sensor 44, distance D1 may be in a range between about one $\mu$m and ten $\mu$m, and may be equal to, greater than or less than the distance D2.

Figure 8:
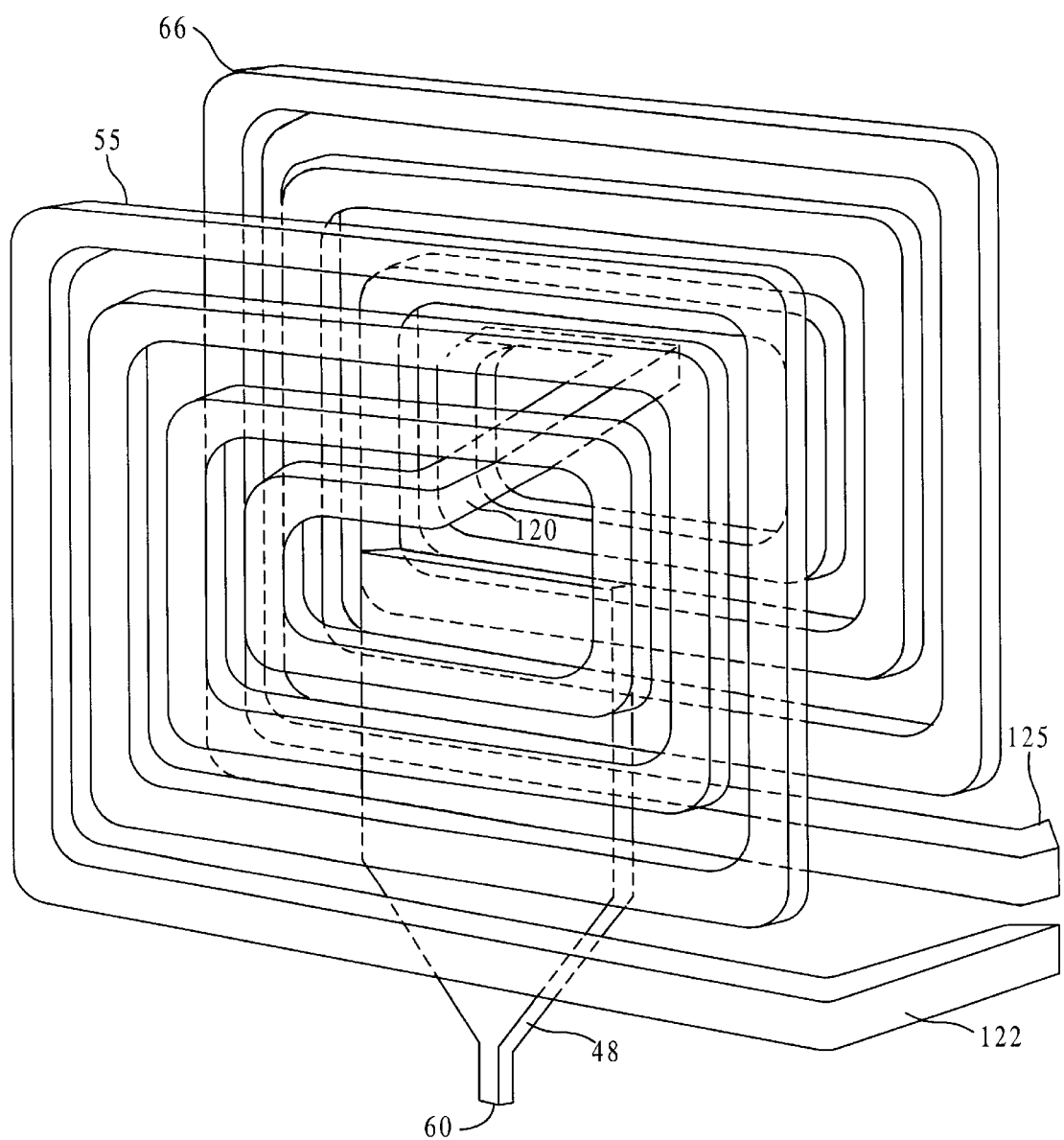
FIG. 8 is a perspective view of a pair of interconnected spiral coil layers sandwiching a recording pole layer.

After polishing the first coil layer 55 a first portion of an electrically conductive interconnect 120 shown in FIG. 8 is formed, upon which another dielectric layer is formed to a thickness that may preferably be between less than one $\mu$m and several $\mu$m, after lapping that exposes the interconnect portion. The first soft magnetic pole layer 58 is then formed along with another portion of the electrically conductive interconnect 120, for example by separate frame plating steps. The first pole layer 58 has a thickness T5 after lapping that may be less than one micron, e.g., 0.3 $\mu$m and a height of about ten to fifteen microns, for example. The first pole layer 58 has a tapered width that funnels magnetic flux through the pole tip 60, the width ranging from about ten microns distal to the media-facing surface 33 to lees than one micron, e.g., 0.3 $\mu$m at the pole tip 60, so that the pole tip has a media-facing area preferably about 0.1 $\mu$m$^2$ or less.

The soft magnetic stud 62 is formed to a thickness T6 of between about two and ten microns by techniques such as window frame plating in plural layers to connect the first pole layer 58 with the second pole layer 64. After polishing the first pole layer 58 a first layer of the stud is formed along with another portion of the electrically conductive interconnect 120, for example by separate frame plating steps.

Another dielectric layer is formed to a thickness that may preferably be between less than one $\mu$m and several $\mu$m after lapping of it, the interconnect portion and the stud layer.

The second electrically conductive coil layer 66 is then formed, for example by frame plating of copper, gold, silver or other electrically conductive materials. Second coil layer 66, shown additionally in FIG. 8, is formed in a spiral formation with winding sections 75 substantially parallel to the media-facing surface 33 in a region adjacent to first pole layer 58. A central winding section 82 is connected with interconnect 120. Second coil layer 66 may have thickness T4 on the order of one $\mu$m, and winding sections 75 have a square cross-section about 1.5 $\mu$m on each side in one embodiment, with a distance between winding sections 75 about one $\mu$m. Second coil layer 66 may be substantially identical to first coil layer 55 but may differ in distance D2 from the media-facing surface. Alternatively, second coil layer 66 may differ from first coil layer 55 in many ways to enhance the performance of transducer 22.

After polishing the second coil layer 66 a final portion of the soft magnetic stud 62 is formed, upon which another dielectric layer is formed to a thickness that may preferably be between less than one $\mu$m and several $\mu$m, after lapping that exposes the stud portion. Second pole layer 64 is then formed, for example by frame plating, to a thickness between less than one and several microns, e.g., 1.5 $\mu$m, a height that preferably matches the first pole layer 58 and a width that may be tens of microns. Second pole layer 64 terminates adjacent the media-facing surface in a second pole tip 68 that faces the media 25, second pole tip 68 having a media-facing surface at least an order of magnitude larger than that of first pole tip 60. For example, second pole tip 68 may have a media-facing area that is greater than 10 $\mu$m$^2$, so that second pole tip may have a media-facing area that is between 100 and 100,000 times as large as that of first pole tip 60. In an alternative embodiment, the first pole layer 58 is thicker than the second pole layer 64 and serves as a flux return pole, and the second pole tip 68 has a much smaller media-facing area than first pole tip 60.

A protective coating 96 of dielectric material such as alumina is formed on the second pole layer 64, which will become the trailing end of the transducer 22. Electrical connections 122 and 125, shown in FIG. 8, extend from coil layers 55 and 66, respectively, to provide electrical contacts either on the trailing end 90 or on a back surface of the head disposed opposite to the media-facing surface 33. Similar electrical leads, not shown, extend from the MR sensor 44 to provide additional electrical contacts either on the trailing end 90 or the back surface.

After forming the protective coating 96 on the trailing end 90, the wafer 28 is diced to form rows of heads, as is known in the art, and the media-facing surface is formed. The protective coating 98 of hard dielectric material such as diamond-like carbon (DLC), tetrahedral amorphous carbon (ta-C), silicon carbide (SiC) or the like is formed. The rows are then divided into individual heads that are attached to suspensions for positioning adjacent disks such as disk 25 in drive system 20.

FIG. 8 shows a perspective view of the spiral coil layer 55 and spiral coil layer 66 interconnected at interconnect 120. Electrical connections 122 and 125 provide current for the coil layers 55 and 66. Tapered first pole layer 48 and pole tip 60 are shown but, for clarity, stud 62 and second pole layer 64 are not.

Although we have focused on teaching the preferred embodiments of an improved electromagnetic transducer, other embodiments and modifications of this invention will be apparent to persons of ordinary skill in the art in view of these teachings. Therefore, this invention is limited only by the following claims, which include all such embodiments and modifications when viewed in conjunction with the above specification and accompanying drawings.

What is claimed is:

1. A magnetic head for reading or writing information on relatively-moving media, the head comprising:
   a body having a media-facing surface,
   a first ferromagnetic layer disposed in said body and terminating in a first pole tip disposed adjacent to said media-facing surface,
   a second ferromagnetic layer disposed in said body and terminating in a second pole tip disposed adjacent to said media-facing surface,
   with said second pole tip having a medium-facing surface that is at least two orders of magnitude greater than that of said first pole tip, and said first and second ferromagnetic layers magnetically coupled to each other in a core region distal to said media-facing surface,
   a first electrically conductive winding section disposed within six microns of said media-facing surface and adjacent to said first ferromagnetic layer to carry a first current in a first direction, and
   a second electrically conductive winding section disposed between said first ferromagnetic layer and said second ferromagnetic layer to carry a second current in a second direction that is substantially opposite to said first direction, wherein said second electrically conductive winding section is part of an electrically conductive winding that substantially encircles said core region.

2. The head of claim 1, further comprising a magnetic field sensor disposed adjacent to one of said ferromagnetic layers, wherein a first magnetic field induced by said first current and a second magnetic field induced by said second current are substantially cancelled by each other at said sensor.

3. The head of claim 1, wherein:
   said first winding section is part of a coil that spirals along a plane that is substantially parallel to said first ferromagnetic layer, and said coil is connected to said winding.

4. The head of claim 1, wherein:
   said first electrically conductive winding section is disposed at a first distance from said media-facing surface,
   said second electrically conductive winding section is disposed at a second distance from said media-facing surface, and
   said first distance is less than said second distance.

5. The head of claim 1, wherein:
   said first electrically conductive winding section is a part of a plurality of substantially parallel electrically conductive winding sections disposed in a first winding layer, and
   said second electrically conductive winding section is a part of a plurality of substantially parallel electrically conductive winding sections disposed in a second winding layer.

6. The head of claim 1, wherein:
   said first electrically conductive winding section is a part of an electrically conductive coil that spirals in a first layer,
   said electrically conductive winding spirals in a second layer, and
   said first spiral layer is connected to said second spiral layer at an interconnect.

7. The head of claim 6, wherein:
   said winding spirals around said core region,
   said coil spiral around an axis that intersects said core region, and
   a magnetic field generated along said axis by current in said coil is counteracted by a magnetic filed generated along said axis by current in said winding.

8. The head of claim 1, wherein:
   said first pole tip is separated from said second pole tip by at least a micron.

9. The head of claim 6, further comprising:
   a magnetoresistive sensor disposed adjacent to one of said pole tips, wherein a magnetic field at said sensor induced by said winding substantially cancels that induced by said coil.

10. The device of claim 6, further comprising a ferromagnetic shield disposed between said sensor and said first ferromagnetic layer, wherein said first ferromagnetic layer extends further than said shield from said media-facing surface.

11. An information storage system comprising:
    a storage medium having a major surface and including a magnetic media layer having an easy axis of magnetization that is substantially perpendicular to said major surface,
    a head having a medium-facing surface disposed adjacent to said storage media,
    a first ferromagnetic core layer disposed in said head and terminating in a first pole tip disposed adjacent to said medium-facing surface,
    a second ferromagnetic core layer disposed in said head and terminating in a second pole tip disposed adjacent to said medium-facing surface,
    with said second pole tip having a medium-facing surface that is at least two orders of magnitude smaller than that of said first pole tip, and said first and second ferromagnetic core layers magnetically coupled distal to said medium-facing surface,
    a first coil spiral including a first plurality of electrically conductive winding sections disposed adjacent to said first ferromagnetic core layer to carry a current in a first direction within six microns of said medium-facing surface, and
    a second coil spiral including a second plurality of electrically conductive winding sections disposed between said first ferromagnetic core layer and said second ferromagnetic core layer to carry the current in a second direction that is substantially opposite to said first direction.

12. The system of claim 11, further comprising a magnetoresistive sensor disposed adjacent to the medium-facing surface, wherein:
    a first magnetic field is induced by said first coil and a second magnetic field is induced by said second coil, and
    said first magnetic field and said second magnetic field are substantially reduced by each other at said magnetoresistive sensor.

13. The of claim 11, wherein:
    a first magnetic field is induced by said first current and a second magnetic field is induced by said second current, and said first magnetic field and said second magnetic field are substantially cancelled by each other at said magnetoresistive sensor the current flows substantially clockwise in said first spiral coil and flows substantially counterclockwise in said second spiral coil, when viewed from a trailing end of said body.

14. The of claim 11, wherein said first plurality of electrically conductive winding sections are connected to said second plurality of electrically conductive winding sections at an interconnect.

15. The system of claim 11, wherein said first and second core layers are magnetically coupled in a core region that is removed from the medium-facing surface, and said second coil encircles said core region.

16. The system of claim 11, wherein said storage medium contains a soft magnetic underlayer adjacent to said media layer and distal to said medium-facing surface.

17. The system of claim 11, wherein said current spirals in a substantially clockwise direction in said first coil and in a substantially counterclockwise direction in said second coil, when viewed from a trailing end of said body.

18. The system of claim 11, wherein a distance between said first pole tip and said second pole tip is at least ten times greater than a distance between said media layer and said medium-facing surface.

19. The system of claim 11, wherein said first plurality of electrically conductive winding sections are disposed closer than said second plurality of electrically conductive winding sections to said medium-facing surface.

20. The system of claim 11, further comprising a magnetoresistive sensor separated from said first coil by a first ferromagnetic shield layer, wherein:

said first ferromagnetic core layer extends from said medium-facing surface a first distance, said first ferromagnetic shield layer extends from said medium-facing surface a second distance, and said second distance is not greater than said first distance.

* * * * *